United States Patent [19]

Kitada

[11] 4,015,090

[45] Mar. 29, 1977

[54] RECORDING AND/OR REPRODUCING APPARATUS

[75] Inventor: Takaharu Kitada, Tokyo, Japan

[73] Assignee: Sony Corporation, Tokyo, Japan

[22] Filed: May 20, 1975

[21] Appl. No.: 579,044

[30] Foreign Application Priority Data

May 28, 1974 Japan .............................. 49-59911

[52] U.S. Cl. ..................... 179/6 R; 179/100.1 C; 179/100.1 PS; 360/12; 360/61; 360/62
[51] Int. Cl.² ................... H04N 1/64; G11B 5/008; G11B 15/02
[58] Field of Search ............ 179/6 R, 6 E, 100.1 C, 179/100.1 PS; 360/12, 61, 62, 137

[56] References Cited
UNITED STATES PATENTS

| | | | |
|---|---|---|---|
| 3,347,996 | 10/1967 | Uchikoshi | 360/62 |
| 3,721,774 | 3/1973 | Yonemoto et al. | 360/61 |
| 3,775,569 | 11/1973 | Lougeay, Jr. et al. | 179/100.1 C |
| 3,794,767 | 2/1974 | Todd | 179/6 R |
| 3,914,551 | 10/1975 | Hunt | 179/6 R |
| 3,919,834 | 11/1975 | Murakami et al. | 179/100.1 C |
| 3,930,266 | 12/1975 | Okamoto | 360/62 |

*Primary Examiner*—Raymond F. Cardillo, Jr.
*Attorney, Agent, or Firm*—Lewis H. Eslinger; Alvin Sinderbrand

[57] ABSTRACT

A recording and/or reproducing apparatus having a plurality of modes of operation, for example, at least recording and reproducing modes of operation, includes a main operating mode selecting device of the non-locked push-button type having push-button actuated switches which are selectively closed momentarily for applying a respective trigger signal to a self-holding operation controlling circuit which thereby assumes a condition corresponding to the selected mode of operation and maintains such condition until another trigger signal is received from the main operating mode selecting device, an auxiliary trigger signal generating circuit operative upon the supplying of electric power therethrough, for example, through a timer-controlled switch, to produce an auxiliary trigger signal, an auxiliary operating mode selecting device, for example, in the form of a manually actuable change-over switch, which is selectively disposable in an inoperative position and in one or more operative positions, for example, corresponding to automatically initiated recording and reproducing operations, and semi-conductor switching elements operative in response to the auxiliary trigger signal when the auxiliary mode selecting device is disposed in one of its operative positions to apply an automatic operation initiating trigger signal to the operation controlling circuit for causing the latter to automatically initiate the operation of the apparatus for which the auxiliary mode selecting device has been set.

12 Claims, 6 Drawing Figures

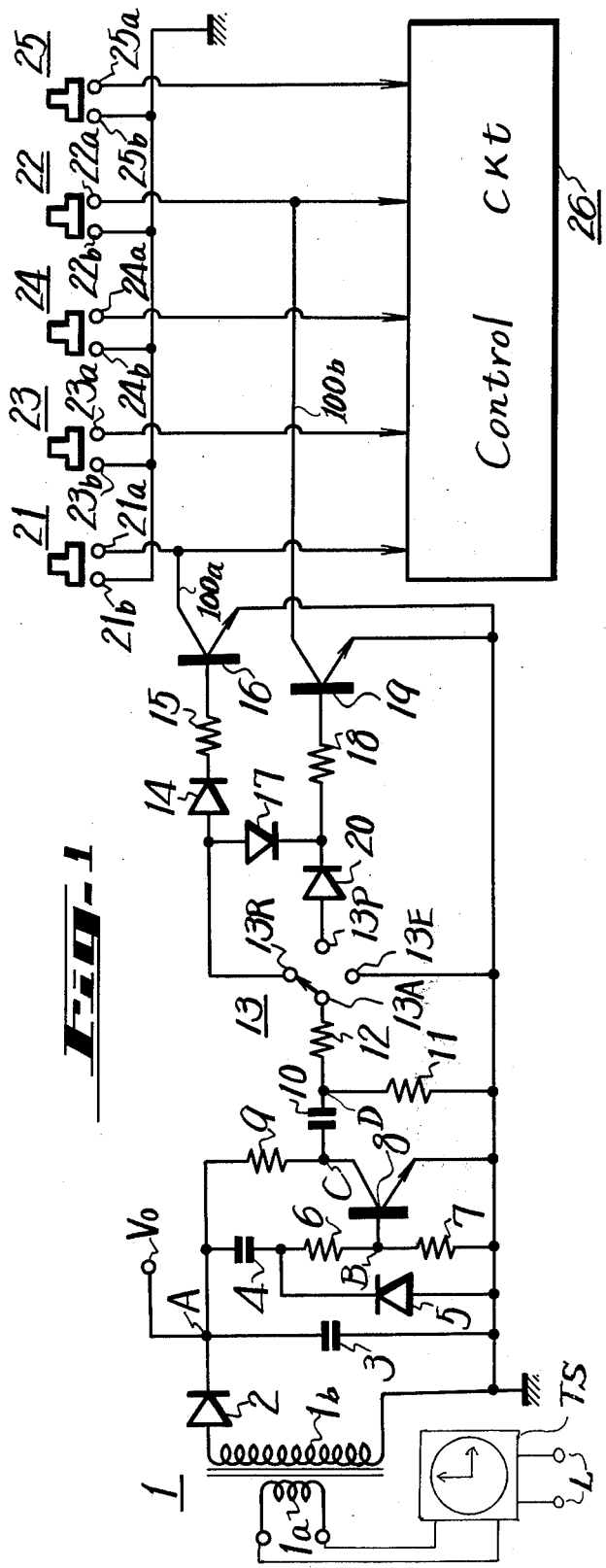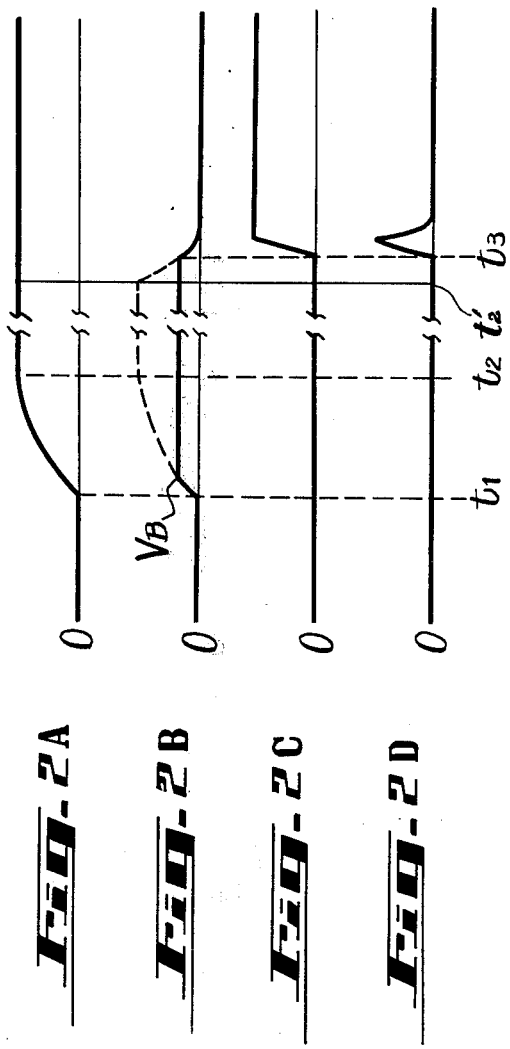

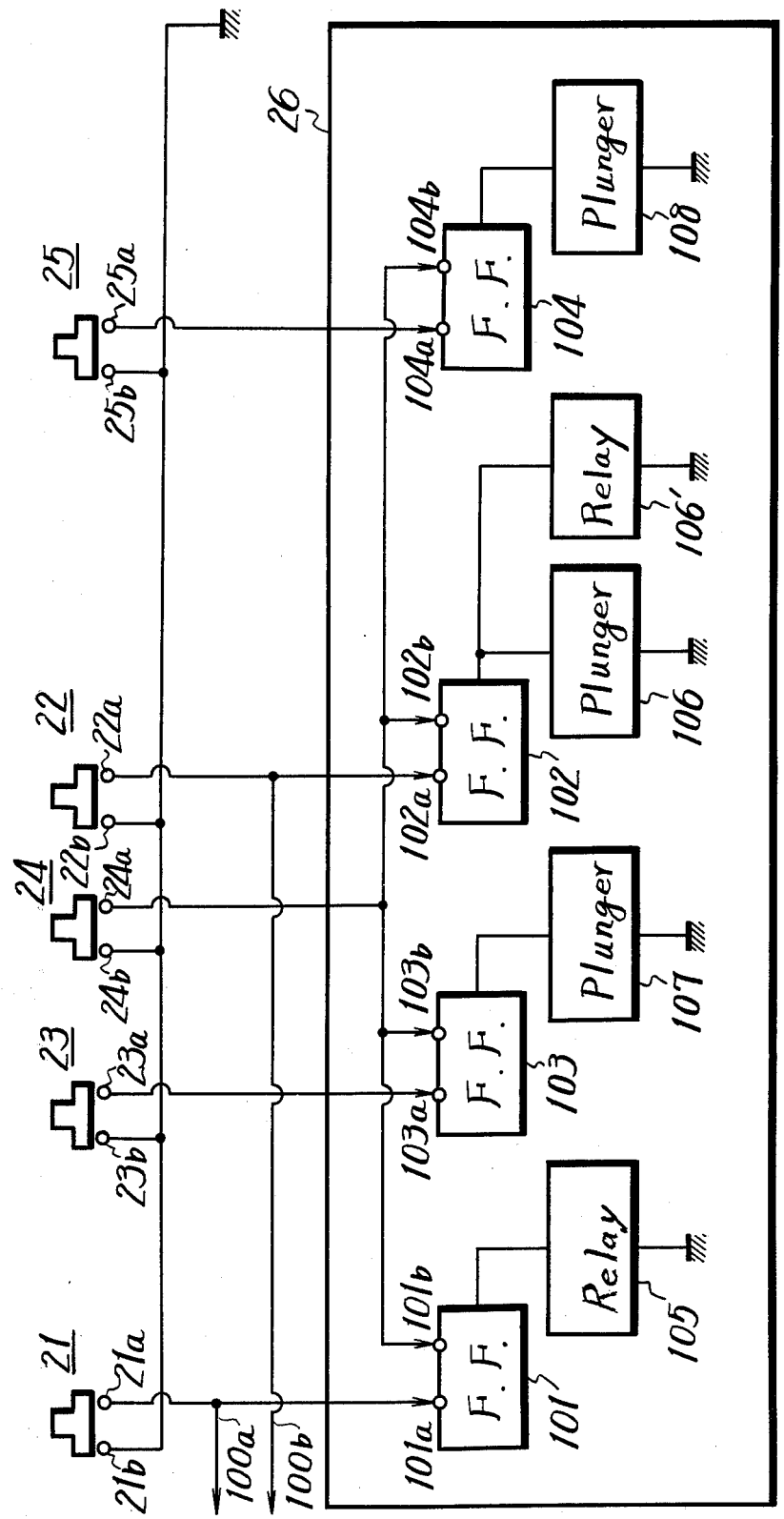

RECORDING AND/OR REPRODUCING APPARATUS

BACKGROUND OF THE INVENTION

1. Field of the Invention

This invention relates generally to magnetic tape recording and/or reproducing apparatus, and more particularly is directed to an improved device by which such apparatus can be automatically operated in response to the reception of a call by an associated telephone or actuation by a timer to either record a telephone message or to reproduce a recorded message or musical sounds and thereby provide an alarm.

2. Description of the Prior Art

Magnetic tape recording and/or reproducing apparatus is usually provided with an operating mode selecting device which includes a plurality of push-buttons that are selectively actuable from rest positions to active positions for selecting respective operating modes of the apparatus. For example, the mode selecting device may include a push-button actuable to select a fast-forward operating mode, a push-button actuable to select a normal-forward operating mode for either reproducing or recording operations, a push-button actuable to select a rewind operating mode, and a push-button actuable for returning the recording and/or reproducing apparatus from any one of the previously mentioned operating modes to a stop or neutral condition. Further, the mode selecting device usually includes a recording push-button which, when actuated simultaneously with the normal-forward push-button, selects the recording operating mode, while actuation of the normal-forward push-button alone selects the reproducing mode of operation.

The existing mode selecting devices are either of the so-called locked push-button type or the non-locked push-button type. In devices of the locked push-button type, each operating mode selecting push-button, when displaced to its active position, is mechanically locked or latched in such active position to maintain the selected operating mode or condition of the apparatus until another of the operating mode selecting push-buttons or the stop push-button is actuated, whereupon the mechanical lock or latch is released to permit return of the previously displaced push-button to its rest position.

In devices of the non-locked push-button type, each of the mode selecting push-buttons, when displaced to its active position is free to be spring-urged back to its rest position as soon as the manually exerted pressure for displacing the push-button is removed from the latter. When any one of the mode selecting push-buttons is temporarily displaced to its active position for momentarily closing a respective switch, a control circuit is conditioned for establishing the respective operating mode and the control circuit is electrically maintained or held in such condition, even though the push-button returns to its rest position, until such time as either the stop push-button is actuated or another of the operating mode selecting push-buttons is actuated to cause the control circuit condition to be altered for establishing another operating mode of the apparatus. Mode selecting devices of the non-locked push-button type, as aforesaid, are advantageous in that only a relatively light force need be applied to any one of the mode selecting push-buttons for momentarily displacing the same and thereby initiating the respective operating mode of the recording and/or reproducing apparatus.

Frequently, it is desired to employ a magnetic tape recording and/or reproducing apparatus, as above, for automatically recording a message received by way of an unattended telephone, or for automatically reproducing music or other sound recorded on a tape in response to the operation of an associated timer, for example, to provide an alarm. When the recording and/or reproducing apparatus has a mode selecting device of the locked push-button type, its automatic recording or reproducing operation, as aforesaid, is made possible by interposing a normally open automatic control switch between the power supply for the apparatus and the drive circuit for the latter, and by effecting automatic closing of such control switch either in response to the reception of a call by the associated telephone when the latter is unattended, or in response to the expiration of a predetermined time period set on a suitable timer. In preparing the apparatus for automatic recording or reproducing operation, each push-button for selecting the respective mode of operation is displaced to its active position where it is locked mechanically to establish the conditions for such mode of operation in the drive circuit even though the latter is not energized by reason of the open condition of the automatic control switch. Thereafter, when the automatic control switch is closed to supply power to the drive circuit, for example, in response to the reception of a call by the associated unattended telephone or the operation of the timer, the apparatus performs a recording or reproducing operation which, in the case of the recording of a telephone message, is discontinued when the control switch returns to its open condition at the conclusion of the call even though each previously displaced push-button of the mode selecting device remains locked in its active position.

However, if the magnetic tape recording and/or reproducing apparatus has a mode selecting device of the non-locked push-button type, the mere interposing of the automatic control switch between the power supply and the control circuit of the apparatus will not be sufficient to adapt the apparatus for the subsequent automatic recording of a message received by an unattended telephone which causes closing of the automatic control switch when a call is received, or for the subsequent automatic reproducing of recorded sounds as an alarm when the automatic control switch is closed by an associated timer. This will be seen from the fact that, if the automatic control switch is open so that the control circuit is not energized at the time when the recording push-button and/or the normal-forward push-button is momentarily displaced to the active position thereof, the control circuit will not be electrically held or maintained in the condition for a recording or reproducing operation, respectively. Thereafter, when the automatic control switch is closed, the control circuit will be and remain, in the condition for the stop mode, and neither a recording or reproducing operation will occur.

Accordingly, when adopting a recording and/or reproducing apparatus having a mode selecting device of the non-locked push-button type for the described automatic operation, it has been the practice to employ, in addition to the automatic control switch between the power supply and the control circuit, a strip of adhesive tape or the like by which the non-locked push-buttons for selecting the recording or reproducing modes of operation can be held in their active positions. Applying such adhesive tape to the mode selecting device when setting up the apparatus for automatic recording or reproducing operations is obviously bothersome, as is the removal of such tape from the mode selecting device when it is desired to return to normal control of the operations by selective actuation of the push-buttons. In order to avoid the obvious disadvantages of the use of adhesive tape, as aforesaid, it has been proposed to provide the apparatus having a mode selecting device of the non-locked push-button type with a separate or additional remote control unit. Such remote control unit includes circuits which are connected in parallel with the switches controlled by the non-locked push-buttons of the mode selecting device for selecting the recording and reproducing modes of operation with each of those circuits in the remote control unit having a respective manually actuable switch which remains, or is mechanically locked in its closed position after being displaced thereto and which is in series with a timer or telephone actuated automatic control switch.

With a remote control unit as described above, the manually actuable switch of the circuit thereof in parallel with, for example, the switch actuable by the normal-forward push-button of the regular mode selecting device, may be displaced to its active position to subsequently condition the apparatus for a reproducing operation when the automatic control switch of the remote control unit is closed, for example, by an associated timer. Once the reproducing operation is initiated by the timer, as aforesaid, such operation cannot be halted by actuation of the stop push-button of the regular mode selecting device, nor can any other operating mode of the apparatus be selected by actuation of the respective push-button of the regular mode selecting device until the manually actuable switch of the remote control unit is manually returned from its locked active position to its open position. Therefore, with the described remote control unit, the latter cannot be set to cause the associated recording and/or reproducing apparatus to automatically perform a reproducing operation at the predetermined time each day, as set on the timer, that is, to act as an alarm clock, while the apparatus is normally controllable at all other times by its mode selecting device. Further, although the control circuit of the recording and/or reproducing apparatus is designed to be controlled in response to momentary closing of the switches associated with the non-locked push-buttons of the mode selecting device, the circuits of the remote control unit which are connected in parallel with such switches remain closed for as long as the automatic control switch is closed either in response to a call being received by the associated telephone or in response to operation of the timer, and the foregoing is undesirable in that it may result in deterioration of the components in the control circuit of the recording and/or reproducing apparatus.

OBJECTS AND SUMMARY OF THE INVENTION

Accordingly, it is an object of this invention to provide a magnetic tape recording and/or reproducing apparatus having a mode selecting device of the non-locking push-button type with an improved arrangement for effecting automatic recording or reproducing operations of the apparatus, which arrangement avoids the above described disadvantages of the arrangements previously employed or proposed for that purpose.

More specifically, it is an object of this invention to provide a recording and/or reproducing apparatus having a main mode selecting device of the non-locking push-button type with an arrangement which may be set to cause automatic recording or reproducing operation of the apparatus without interfering with the normal control of the apparatus by its main mode selecting device.

Another object is to provide a recording and/or reproducing apparatus, as aforesaid, with an auxiliary operating mode selecting device which may be simply set for automatic initiation of a recording or reproducing operation, for example, in response to reception of a telephone call or the arrival of a predetermined time as set on a timer.

A further object is to provide a recording and/or reproducing apparatus having a main mode selecting device of the non-locking push-button type, with an auxiliary operating mode selecting device which includes a single change-over switch manually actuable for achieving automatic recording or reproducing operations of the apparatus.

Still another object is to provide a recording and/or reproducing apparatus having an operation controlling circuit in which various modes of operation are established by the momentary grounding of respective terminals of such circuit through operation initiating switches actuated by respective non-locking push-buttons, with an auxiliary operating mode selecting device which, when electric power is applied thereto through a timer- or telephone-controlled switch, is operative to momentarily ground the terminal or terminals of the operation controlling circuit corresponding to the mode of operation for which the auxiliary mode selecting device has been set.

In accordance with an aspect of this invention, a recording and/or reproducing apparatus having a plurality of modes of operation is provided with main operating mode selecting means which are selectively actuable for producing operation initiating trigger pulses, for example, in response to momentary grounding of selected circuits, respectively corresponding to the several modes of operation, a self-holding operation controlling circuit actuable by the operation initiating trigger pulses for establishing and maintaining respective conditions corresponding to selected modes of operation, auxiliary trigger signal generating means operative in response to the applying of electric power thereto, for example, through a timer- or telephone-controlled switch, for producing an auxiliary trigger signal, auxiliary operating mode selecting means, for example, in the form of a manually actuable change-over switch, selectively disposed and maintained in an operative position and in one or more operative positions corresponding to respective modes of operation of the apparatus, and triggering means responsive to the auxiliary trigger signal when the auxiliary mode selecting means is in an operative position thereof for applying at least one respective automatic operation initiating trigger signal to the operation controlling circuit so as to cause the latter to automatically assume the condition thereof corresponding to the mode of operation selected by the auxiliary mode selecting means.

The above, and other objects, features and advantages of the invention, will be apparent in the following detailed description of an illustrative embodiment which is to be read in connection with the accompanying drawings.

BRIEF DESCRIPTION OF THE DRAWINGS

FIG. 1 is a schematic wiring diagram showing a recording and/or reproducing apparatus having a main operating mode selecting device of the non-locking push-button type and being provided with an auxiliary operating mode selecting device according to an embodiment of the present invention;

FIGS. 2A–2D are waveform diagrams to which reference will be made in explaining the operation of the apparatus shown on FIG. 1; and FIG. 3 is a block diagram of a specific operation controlling circuit that may be included in the apparatus of FIG. 1.

DESCRIPTION OF A PREFERRED EMBODIMENT

Referring to FIG. 1 in detail, in which only those components of a magnetic tape recording and/or reproducing apparatus necessary for an understanding of this invention are shown, it will be seen that such apparatus is provided with a power source transformer 1 having a primary winding 1a which is connected to an AC electric power source, such as, the usual household electric lines indicated at L, through a telephone-or timer-controlled switch TS for supplying electric power to primary winding 1a either at a predetermined time set on the timer or in response to the reception of a telephone call by the associated telephone.

In accordance with this invention, an auxiliary trigger signal generating circuit is provided for producing an auxiliary trigger signal in response to the application of electric power to primary winding 1a through timer- or telephone-controlled switch TS. In the embodiment of FIG. 1, such auxiliary trigger signal generating circuit is shown to include a rectifying diode 2 having its anode connected to one end of the secondary winding 1b of transformer 1 which has the other end of its secondary winding 1b connected to ground, while the cathode of diode 2 is also connected to ground through a capacitor 3 of relatively large capacity. The connection point A between diode 2 and capacitor 3 may be connected to a terminal $V_o$ to there provide a DC voltage for operation of other circuits (not shown) of the recording and/or reproducing apparatus. The connection point A is further connected to ground through a series circuit of a capacitor 4 and a diode 5 which is polarized for discharging capacitor 4. The connection point between capacitor 4 and diode 5 is grounded through resistors 6 and 7 connected in series. The capacitor 4 and resistor 6 are dimensioned so that the time constant determined thereby will be longer than the rising up time constant of the voltage appearing at the connection point A following the application of electric power to transformer 1. Further, the connection point B between resistors 6 and 7 is connected to the base of an NPN-type transistor 8 which has its emitter connected to ground and its collector connected through a resistor 9 to the connection point A. The auxiliary trigger signal generating circuit is completed by a differentiating circuit constituted by a capacitor 10 and resistor 11 connected in a series circuit extending from a connection point C, between resistor 9 and the collector of transistor 8, to the ground. The auxiliary trigger signal is derived, as hereinafter described in detail, at the connection point D between capacitor 10 and resistor 11.

The recording and/or reproducing apparatus according to this invention is further shown to have an auxiliary operating mode selecting device 13 which may simply be constituted by a multi-position change-over switch having a movable contact 13A connected with connection point D through a resistor 12, and a plurality of fixed contacts 13R, 13P and 13E which are selectively engaged by movable contact 13A in response to manual actuation of the change-over switch. It will be understood that the change-over switch 13 is of the so-called locking type, that is, the movable contact 13A, after having been displaced to engage a selected one of the fixed contacts 13R, 13P or 13E, remains in engagement with the selected fixed contact until the movable contact 13A is again manually displaced to engage another of the fixed contacts.

As shown, fixed contact 13E is connected to ground so that, when movable contact 13A is engaged with fixed contact 13E, that is, in the inoperative position of the auxiliary operating mode selecting device or switch 13, any auxiliary trigger signal appearing at connection point D is merely grounded and does not affect the mode of operation of the recording and/or reproducing apparatus. However, when switch 13 has its movable contact 13A engaged with fixed contact 13R or fixed contact 13P, an auxiliary trigger signal appearing at connection point D is applied through switch 13 to a triggering circuit which is made operative thereby to provide one or more automatic operation initiating trigger signals for automatically initiating the mode of operation of the recording and/or reproducing apparatus selected by the setting or positioning of switch 13. More specifically, as shown, fixed contact 13R is connected through a diode 14 and a resistor 15, in series, to the base of an NPN-type transistor 16 and through a diode 17 and resistor 18, in series, to the base of an NPN-type transistor 19. Further, the fixed contact 13P of switch 13 is connected through a diode 20 to the connection point between diode 17 and resistor 18. The emitters of transistors 16 and 19 are connected together to ground, while the collectors of transistors 16 and 19 are connected, as at 100a and 100b, respectively, to the later described operation controlling circuit of the recording and/or reproducing apparatus. It will be apparent that, when switch 13 is positioned to engage its movable contact 13A with fixed contact 13R, which position is for selecting automatic initiation of the recording mode of operation of the apparatus, the auxiliary trigger signal appearing at connection point D will be transmitted through diode 14 and resistor 15 to the base of transistor 16 and through diode 17 and resistor 18 to the base of transistor 19 so that both transistors 16 and 19 are momentarily turned ON or made conductive, with the result that the connections 100a and 100b are momentarily grounded for applying respective automatic operation initiating trigger signals. On the other hand, when switch 13 is positioned to engage movable contact 13A with fixed contact 13P, which position corresponds to the selection of automatic initiation of a reproducing or playback mode of operation of the apparatus, the appearance of an auxiliary trigger signal at connection point D is effective to momentarily turn ON only transistor 19 for momentarily grounding connection 100b and thereby applying a corresponding automatic operation initiating trigger signal through that connection.

As shown, a main operating mode selecting device of the recording and/or reproducing apparatus is of the non-locking push-button type and includes non-locking push-button switches 21, 22, 23, 24 and 25 which are selectively actuable for manually initiating respective modes of operation of the apparatus. The push-button switches 21–25, being of the non-locking type, are urged by suitable springs (not shown) to the illustrated rest or open positions and each may be manually depressed for closing their respective contacts, with such contacts being returned to the normal open condition when the manually applied pressure or actuating force is removed from the push-button. In the illustrated embodiment, push-button switch 22 is actuable alone to select the reproducing or playback mode of operation of the apparatus, that is, to cause a conventional tape driving assembly (not shown) of the apparatus to effect forward movement of the tape at a normal speed while conventional signal reproducing circuits (not shown) of the apparatus are made operative for reproducing or playing back signals magnetically recorded on a tape. On the other hand, push-button switch 21 is provided for selecting the recording mode of operation of the apparatus when depressed or actuated simultaneously with push-button switch 22 so that the tape is again driven at its normal forward speed while the circuits of the apparatus are then made operative for recording signals on the magnetic tape. Push-button switches 23 and 25 are respectively provided for selecting the rewind and fast-forward modes of operation of the apparatus, while push-button switch 24 is actuable to halt or stop operation of the apparatus in accordance with any previously selected mode and to return the operation controlling circuit 26 to its original or rest condition.

As shown particularly on FIG. 3, the operation controlling circuit 26 of the self-holding type for establishing and maintaining respective conditions corresponding to selected modes of operation in response to operation initiating trigger pulses and may include bistable elements 101, 102, 103 and 104, for example, in the form of flip-flops. The flip-flops 101, 102, 103 and 104 are shown to have respective set terminals 101a, 102a, 103a and 104a and respective reset terminals 101b, 102b, 103b and 104b. Each of the flip-flops 101–104 is adapted to be triggered to its operative state in response to the application of an operation initiating trigger signal or momentary grounding of its respective set terminal, while each of the flip-flops is changed over or reset to its inoperative state in response to the application of a stop trigger signal, or momentary grounding of its respective reset terminal.

When in its operative state, flip-flop 102 causes energizing of a solenoid or plunger 106 by which the usual tape driving assembly (not shown) of the recording and/or reproducing apparatus is conventionally conditioned to drive the tape at its normal forward speed, while the operative state of flip-flop 102 further causes energizing of a relay 106' by which the signal-reproducing or playback circuits of the apparatus are rendered operative. The flip-flop 101, when in its operative state, causes energizing of a relay 105 by which the signal-recording circuits of the apparatus are rendered operative. Further, flip-flops 103 and 104 have plungers or solenoids 107 and 108, respectively, associated therewith so that, when flip-flop 103 is in its operative state for energizing plunger 107, tape driving assembly of the apparatus is conventionally conditioned to effect rewinding of the tape at a relatively high speed, whereas, when flip-flop 104 is in its operative state to energize plunger or solenoid 108, the latter conventionally conditions the tape driving assembly of the apparatus for causing fast-forward movement of the tape.

As shown specifically on FIG. 3, push-button switches 21, 22, 23 and 25 have contacts 21a, 22a, 23a and 25a which are respectively connected to set terminals 101a, 102a, 103a and 104a of flip-flops 101, 102, 103 and 104, respectively. Further, push-button switch 24 is shown to have a contact 24a which is connected to the reset terminals 101b, 102b, 103b and 104b of all of the flip-flops. The push-button switches 21–25 are also shown to have contacts 21b–25b which are all connected to ground. Finally, the lines or connections 100a and 100b extending from the collectors of transistors 16 and 19, respectively, are shown to be connected to set terminal 101a of flip-flop 101 and set terminal 102a of flip-flop 102, respectively.

It will be apparent that, when any one of the push-button switches 21, 22, 23 and 25 is actuated or depressed to its closed condition and then released for return to its rest or open condition, the effect thereof is to momentarily ground the set terminal of the respective flip-flop 101, 102, 103 or 104 so as to condition such flip-flop in its operative state for establishing and maintaining the respective mode of operation of the recording and/or reproducing apparatus. Similarly, when both of the transistors 16 and 19 are turned ON momentarily in response to the application of an auxiliary trigger signal to the base of each of those transistors, the effect thereof is to momentarily ground the set terminals 101a and 102a for causing flip-flops 101 and 102 to assume their operative states and thereby establish the recording mode of operation of the apparatus. When only transistor 19 is momentarily turned ON by the application of an auxiliary trigger signal to its base, the effect thereof is to momentarily ground set terminal 102a of flip-flop 102 for establishing the operative state of the latter, whereby the apparatus is conditioned for its reproducing or playback mode of operation. After a selected mode of operation of the apparatus has been established, the manual actuation of the stop push-button switch 24 for momentarily closing its contacts is effective to momentarily connect the reset terminals of all of the flip-flops to ground so that each of the flip-flops then in its operative state is returned to its inoperative state.

The above described recording and/or reproducing apparatus according to this invention operates as follows:

When normal operations of the apparatus are desired, that is, when it is desired to effect manual selection of the operating mode of the apparatus by means of the main operating mode selecting device constituted by the non-locking push-button switches 21–25, switch 13 constituting the auxiliary operating mode selecting device is disposed in its inoperative position, that is, with its movable contact 13A engaging fixed contact 13E which is connected to ground. With switch 13 thus positioned, any auxiliary trigger signal appearing at the connection point D in response to the closing of the timer- or telephone-controlled switch TS is isolated from transistors 16 and 19 so that such transistors remain in their normal OFF or non-conductive state and can exert no influence on the operation controlling circuit 26. Thereafter, any one of the push-button switches 21, 22, 23 and 25 may be actuated to select the respective mode of operation of the apparatus. For example, if the push-button switch 22 is actuated or depressed for closing or completing the circuit between its contacts 22a and 22b, set terminal 102a of flip-flop 102 receives an operation initiating trigger pulse, that is, is momentarily connected to ground, so that flip-flop 102 assumes its operative state and plunger 106 and relay 106' are energized for establishing the reproducing or playback mode of operation of the apparatus. Operation of the apparatus in such reproducing or playback mode then continues until stop push-button 24 is actuated to close or complete the circuit between its contacts 24a and 24b with the result that reset terminal 102b receives a stop trigger signal, that is, is momentarily connected to ground, for causing changeover of flip-flop 102 to its inoperative state in which plunger 106 and relay 106' are deenergized for halting the reproducing or playback operation. Of course, any of the other modes of operation of the apparatus can be similarly selected by suitable actuation of the push-button switches 21, 22, 23 and 25. So long as switch 13 is in its inoperative position, as described above, the timer- or telephone-controlled switch TS has no influence on the operation of the recording and/or reproducing apparatus under the control of the main operating mode selecting device.

If it is desired to employ the apparatus according to this invention as an alarm, for example, for awakening a person from sleep at a predetermoned time by the reproduction of playback of music or other sounds recorded on a magnetic tape, the timer-controlled switch TS is conventionally set to close at such predetermined time and the auxiliary operating mode selecting device or switch 13 is set to engage its movable contact 13A with its fixed contact 13P. At the predetermined time set on the timer, switch TS closes so that an AC voltage is applied across primary winding 1a of power source transformer 1 and a voltage is induced at the end of the secondary winding 1b connected to diode 2. Such induced voltage is rectified by diode 2 and capacitor 3. Since capacitor 3 has a relatively large capacity, as previously described, the voltage appearing at connection point A rises slowly from the time $t_1$ when timer-controlled switch TS is initially closed and finally attains a normal or constant voltage at the time $t_2$. as shown by the curve on FIG. 2A. Simultaneously, the voltage at the connection point B between resistors 6 and 7 rises slowly from the time $t_1$ in response to the rising voltage at connection point A. However, soon after the commencement of the voltage rise at connection point B, such voltage turns ON transistor 8 and, since the base current of transistor 8 then flows in the transistor, the voltage at connection point B becomes constant at the base voltage $V_B$, as indicated by the solid line on FIG. 2B. The curve shown in broken lines on FIG. 2B indicates the variation with time of the voltage at the connection point between capacitor 4 and resistor 6. Since the time constant determined by capacitor 4 and resistor 6 is selected to be longer than the rising up time constant of the voltage at connection point A, as previously described, the charging of capacitor 4 is completed at a time $t'_2$ subsequent to the time $t_2$ at which the voltage at connection point A attains its normal or stabilized value. Upon the completion of the charging of capacitor 4 at the time $t'_2$, the voltage at the connection point between capacitor 4 and resistor 6 begins to decline, as indicated by the broken line on FIG. 2B until, at the time $t_3$, the voltage applied to the base of transistor 8 sinks to below the voltage required to maintain transistor 8 in its ON state. It will be apparent that, during the interval from approximately the time $t_1$ to the time $t_3$, transistor 8 is turned ON so that connection point C is connected directly to ground and the voltage at such connection point is zero or ground potential, as indicated on FIG. 2C. However, when the voltage at connection point B declines below the value required to maintain transistor 8 in its ON condition, that is, at the time $t_3$, transistor 8 is turned OFF with the result that the voltage at connection point C rises and is thereafter maintained at a substantially constant value as shown on FIG. 2C. The voltage obtained at connection point C is differentiated by capacitor 10 and resistor 11, with the result that a positive auxiliary trigger pulse or signal is obtained at connection point D at the time $t_3$, as shown on FIG. 2D. Such auxiliary trigger pulse is supplied through resistor 12 and engaged contacts 13A and 13P of switch 13, and thence through diode 20 and resistor 18 to the base of transistor 19 so as to momentarily turn ON the latter transistor. When transistor 19 is momentarily turned ON, connection 100b to the set terminal 102a of flip-flop 102 is momentarily grounded. Therefore, flip-flop 102 assumes its operative state for energizing plunger 106 and relay 106' and thereby conditioning the apparatus for a reproducing or playback operation.

After the auxiliary trigger pulse is obtained at connection point D and a reproducing or playback operation of the apparatus is initiated in response thereto, no further trigger signal is provided at connection point D. More specifically, after capacitor 4 has been completely charged and transistor 8 has been turned OFF, no voltage is obtained at connection point B by reason of capacitor 4 and hence transistor 8 is maintained in its OFF condition. Therefore, the voltage at connection point C is a constant DC voltage and no further trigger signal is obtained at the connection point D which forms the output of the differentiation circuit constituted by capacitor 10 and resistor 11.

After a reproducing or playback operation of the apparatus has been automatically initiated by timer-controlled switch TS, the recording and/or reproducing apparatus is freely controllable by its main operating mode selecting device. Thus, for example, after a reproducing or playback operation has been initiated at a predetermined time by the operation of timer-controlled switch TS, stop push-button switch 24 may be actuated or closed so as to momentarily ground reset terminal 102b of flip-flop 102 with the result that the latter is returned to its inoperative state for deenergizing plunger 106 and relay 106' and thereby halting the reproducing or playback operation. Thereafter, even though the auxiliary operating mode selecting device or switch 13 remains in its position for automatic initiation of a reproducing or playback operation of the apparatus, the push-button switches 21–25 of the main operating mode selecting device may be selectively actuated for obtaining the respective desired modes of operation of the apparatus.

As is the case in conventional timer-controlled switches, the switch TS may remain closed for only a relatively short time interval after the time for which the timer has been set, whereupon switch TS returns to its normal open condition. When switch TS returns to its open condition so that electric power is no longer applied to transformer 1, the electric charges stored on capacitors 3 and 4 are discharged by way of diode 5. Following such discharging of capacitors 3 and 4, when the predetermined time set on timer-controlled switch TS is again reached, the previously described operating cycle may be repeated for automatic initiation of a reproducing or playback operation of the apparatus. Thus, the timer-controlled switch TS can be set to cause the apparatus to function automatically as an alarm at a predetermined time each day, while the apparatus may be otherwise manually controlled by its main operating mode selecting device for performing the usual functions of a magnetic tape recording and/or reproducing apparatus.

If it is desired to employ the apparatus according to this invention for the automatic recording of telephone messages received by an associated telephone while the latter is unattended, the switch TS may then be of a conventional telephone-controlled type so as to be closed only during each time interval when the associated telephone is receiving a call. In that case, when the telephone is to be left unattended, auxiliary operating mode selecting device or switch 13 is disposed in the position shown on FIG. 1, that is, with its movable contact 13A engaging the fixed contact 13R. Thereafter, whenever switch TS is closed in response to the reception of a call by the associated telephone, an auxiliary trigger pulse is provided at connection point D, in the same manner as previously described, and such trigger pulse is applied through switch 13 to the base of transistor 16 and also to the base of transistor 19 with the result that both transistors 16 and 19 are momentarily turned ON so as to momentarily ground the set terminals 101a and 102a of flip-flops 101 and 102. Therefore, flip-flops 101 and 102 simultaneously assume their operative states for energizing relay 105, plunger 106 and relay 106', that is, for establishing the condition of operation controlling circuit 26 corresponding to a recording operation of the apparatus, and during which the apparatus may function to record the telephone message being received. After the initiation of a recording operation in response to the actuation of the telephone-controlled switch TS, the apparatus according to this invention is once again free to have its operations controlled in the normal manner by suitable actuation of its main operating mode selecting device, that is, by selective actuation of any one of its push-button switches 21–25.

It will be apparent from the foregoing that a recording and/or reproducing apparatus according to this invention may have a recording or reproducing operation thereof automatically initiated merely by suitable positioning of the auxiliary mode selecting device or switch 13, and that such arrangement of the apparatus for automatic initiation of a recording or reproducing operation does not interfere with the normal selection of the mode of operation of the apparatus by means of the non-locking push-button switches 21–25. Further, it will be seen that, insofar as the operation controlling circuit 26 is concerned, the automatic initiation of either a recording or reproducing operation is effected by an automatic operation initiation trigger signal, specifically, by momentary grounding of a respective terminal, which is indistinguishable from the operation initiating trigger signal resulting from manual actuation of the main operating mode selecting device for achieving the same mode of operation. Thus, the provision for automatic initiation of a recording or reproducing operation will not undesirably affect the operation controlling circuit 26.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A recording and/or reproducing apparatus having a plurality of modes of operation, comprising main operating mode selecting means which are selectively actuable for producing operation-initiating trigger pulses respectively corresponding to said modes of operation, a self-holding operation-controlling circuit comprising signal-responsive means actuable by said operation-initiating trigger pulses for establishing and maintaining respective conditions corresponding to selected modes of operation, auxiliary trigger signal generating means operative in response to applying of electric power thereto for producing an auxiliary trigger signal, auxiliary operating mode-selecting means selectively disposable and maintainable in an inoperative position and in at least one operative position corresponding to a respective one of said modes of operation of the apparatus, and triggering means responsive to said auxiliary trigger signal in said operative position of the auxiliary mode-selecting means for applying a respective automatic operation-initiating trigger signal to said signal-responsive means for causing the latter to automatically assume the condition thereof corresponding to the mode of operation selected by said auxiliary mode-selecting means.

2. A recording and/or reproducing apparatus according to claim 1; in which said auxiliary trigger signal generating means includes a transformer having a primary winding adapted to be connected to a source of A.C. electric power and a secondary winding which is grounded at one end, a first diode connected to the other end of said secondary winding and through a first capacitor to ground for obtaining a D.C. voltage at a first connection point between said first diode and first capacitor, a second capacitor and a second diode connected in series between said first connection point and ground, first and second resistors connected in series to ground from a second connection point between said second capacitor and said second diode, said second capacitor and first resistor being selected to provide a time constant greater than the rising time constant of said D.C. voltage obtained at said first connection point, a transistor having a collector-emitter circuit connected between said first connection point and ground and a base electrode connected between said first and second resistors, and differentiating circuit means connected across said collector-emitter circuit to provide said auxiliary trigger signal when said transistor changes over from a conductive state to a non-conductive state.

3. A recording and/or reproducing apparatus according to claim 1; further comprising timer-controlled switch means for supplying electric power to said auxiliary trigger signal generating means commencing at a predetermined time.

4. A recording and/or reproducing apparatus according to claim 1; further comprising telephone-controlled switch means for supplying electric power to said auxiliary trigger signal generating means upon the reception of a telephone call.

5. A recording and/or reproducing apparatus according to claim 1; in which said operation controlling circuit has at least first and second terminals and assumes a condition corresponding to a reproducing mode of the apparatus in response to the momentary grounding of said first terminal and a condition corresponding to a recording mode of the apparatus in response to momentary grounding of said first and second terminals, said main operating mode selecting means includes at least first and second operation initiating switches actuable by respective non-locking push-buttons for grounding said first and second terminals, respectively, said triggering means includes first and second semiconductor switching elements responsive to said auxiliary trigger signal for grounding said first and second terminals, respectively, said auxiliary mode selecting means, when in said one operative position, applies said auxiliary trigger signal only to said first semiconductor switching element, and said auxiliary mode selecting means is disposable in a second operative position for applying said auxiliary trigger signal to said first and second semiconductor switching elements.

6. A recording and/or reproducing apparatus according to claim 5; in which said auxiliary trigger signal generating means includes a capacitor, means for charging said capacitor in response to the application of electric power to the auxiliary trigger signal generating means, a transistor rendered conductive during the charging of said capacitor and returned to a normal non-conductive state upon the completion of said charging of the capacitor, and means for producing said auxiliary trigger signal in response to the return of said transistor from its conductive state to said non-conductive state.

7. A recording and/or reproducing apparatus according to claim 1; in which said main operating mode selecting means include a plurality of operation initiating switches actuable by respective non-locking push-buttons for producing the respective operation initiating trigger signals corresponding to said modes of operation.

8. A recording and/or reproducing apparatus according to claim 7; in which said main operating mode selecting means further include a stop switch actuable by a respective non-locking push-button for producing a stop trigger signal; and said operation controlling circuit includes a plurality of flip-flops corresponding to said modes of operation and each having a set terminal connected with a respective one of said operation initiating switches and a reset terminal connected with said stop switch so that each of said flip-flops is set to an operative state in response to an operation initiating trigger signal from the respective operation initiating switch and is reset to an inoperative state in response to said stop trigger signal from said stop switch.

9. A recording and/or reproducing apparatus according to claim 7; in which said main operating mode selecting means further include a stop switch actuable by a respective non-locking push-button for producing a stop trigger signal; and said operation controlling circuit includes a plurality of bistable elements respectively corresponding to said modes of operation and each having an operative state to which it is triggered in response to an operation initiating trigger signal from the respective operation initiating switch, and an inoperative state to which each of said bistable elements is triggered in response to a stop trigger signal from said stop switch.

10. A recording and/or reproducing apparatus according to claim 9; in which one of said modes of operation is a reproducing mode, and the bistable element corresponding to said reproducing mode is also triggered to said operative state thereof by said automatic operation initiating trigger signal in response to said auxiliary trigger signal when said auxiliary operating mode selecting means is in said one operative position thereof.

11. A recording and/or reproducing apparatus according to claim 10; in which another of said modes of operation is a recording mode, and said auxiliary operating mode selecting means has a second operative position corresponding to said recording mode.

12. A recording and/or reproducing apparatus according to claim 11; in which the condition of said operation controlling circuit for said recording mode is established by said bistable element corresponding to said reproducing mode and the bistable element corresponding to the recording mode being simultaneously in the operative state thereof; and in which said triggering means is operative, in said second operative position of said auxiliary mode selecting means, to apply automatic operation initiating signals to said bistable elements corresponding to said reproducing and recording modes, respectively, in response to said auxiliary trigger signal.

* * * * *